United States Patent
Mangano et al.

(10) Patent No.: US 9,390,040 B2
(45) Date of Patent: Jul. 12, 2016

(54) ON-CHIP INTERCONNECT METHOD, SYSTEM AND CORRESPONDING COMPUTER PROGRAM PRODUCT

(75) Inventors: Daniele Mangano, San Gregorio di Catania (IT); Giovanni Strano, Taomina (IT); Giuseppe Falconeri, Sant' Agata Li Battiati (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 515 days.

(21) Appl. No.: 12/966,843

(22) Filed: Dec. 13, 2010

(65) Prior Publication Data

US 2011/0149735 A1 Jun. 23, 2011

(30) Foreign Application Priority Data

Dec. 18, 2009 (IT) .............................. TO2009A1000

(51) Int. Cl.
*G06F 13/368* (2006.01)

(52) U.S. Cl.
CPC ...... *G06F 13/368* (2013.01); *G06F 2213/0038* (2013.01); *Y02B 60/1228* (2013.01)

(58) Field of Classification Search
None
See application file for complete search history.

(56) References Cited

U.S. PATENT DOCUMENTS

| | | | | |
|---|---|---|---|---|
| 5,126,999 A | * | 6/1992 | Munter et al. | 370/415 |
| 5,463,624 A | * | 10/1995 | Hogg et al. | 370/461 |
| 5,892,766 A | * | 4/1999 | Wicki et al. | 370/412 |
| 6,396,809 B1 | * | 5/2002 | Holden et al. | 370/236 |
| 7,039,750 B1 | | 5/2006 | Regula et al. | |
| 7,099,276 B1 | * | 8/2006 | Kalkunte et al. | 370/230.1 |
| 7,400,596 B1 | * | 7/2008 | Robertson et al. | 370/312 |
| 2001/0038629 A1 | * | 11/2001 | Shinohara | 370/394 |
| 2002/0141427 A1 | * | 10/2002 | McAlpine | 370/413 |
| 2006/0092944 A1 | * | 5/2006 | Wingard et al. | 370/395.2 |
| 2007/0121720 A1 | | 5/2007 | Yamane et al. | |
| 2008/0104367 A1 | * | 5/2008 | Blumrich et al. | 712/11 |
| 2009/0003212 A1 | * | 1/2009 | Kwan et al. | 370/235 |

OTHER PUBLICATIONS

Italian Search Report on Patent Application No. TO2009A001000, mailed Jun. 9, 2010, pp. 7.

* cited by examiner

*Primary Examiner* — Chirag Shah
*Assistant Examiner* — Joshua Smith
(74) *Attorney, Agent, or Firm* — Allen, Dyer, Doppelt, Milbrath & Gilchrist, P.A.

(57) ABSTRACT

In a method for making an on-chip interconnect for conveying between a set of initiators and a set of targets in which traffic is organized in classes of service, priority values representing the classes of service are associated with the traffic. The method further includes propagating the priority values towards the points of the network where an arbitration is performed between two classes of service of the traffic, and providing arbitration as a function of the priority values.

18 Claims, 4 Drawing Sheets

ON-CHIP INTERCONNECT METHOD, SYSTEM AND CORRESPONDING COMPUTER PROGRAM PRODUCT

RELATED APPLICATION

The present application claims priority of Italian Patent Application No. TO2009A001000 filed Dec. 18, 2009, which is incorporated herein in its entirety by this reference.

FIELD OF THE INVENTION

The present invention relates to on-chip interconnect techniques. More particularly, the present invention has particular utility in the implementation of an end-to-end Quality-of-Service (QoS) mechanism in a data-communication system. In the area of Systems-on-Chip (SoCs), the present invention finds utility in the interconnect technologies of circuit-switching types such as STBus, AXI, etc. and also of Network-on-Chip (NoC) types.

BACKGROUND

In recent years, thanks to the introduction of the NoC paradigm, on-chip interconnect technology has been able to sustain the development of an ever-increasing number of SoC products. However, to render possible development of a new generation of SoCs it is necessary to perform a further step ahead. In effect, the complexity of SoCs renders extremely complex the problem of designing on-chip interconnect with a given quality of service (QoS) so as to force designers to make considerable efforts in terms of time and activity.

In the past, various techniques of implementation of QoS have adopted an approach that can be defined as "static". The main disadvantage of this approach lies in the fact that the result depends markedly upon the particular interconnect architecture. For example, the bandwidth engaged by a given IP functioning as initiator in communicating with a given IP functioning as target depends upon the particular routing path followed during the communication and upon the traffic that flows through the same path or part thereof. It may consequently be stated that the solutions based upon a static approach do not enable an end-to-end QoS proper to be obtained.

Another approach suggested in the literature for implementing a good QoS consists in adopting so-called virtual channels (VCs). This approach enables better results to be obtained as compared to a pure static solution, even though at least three orders of problems arise.

A first order of problems is that of partial QoS: virtual channels enable separation of the classes of service, but do not provide any mechanism for managing the performance within one and the same class of service. In other words, within one and the same class the same problems typical of the static approach are re-proposed.

A second order of problems is linked to costs. To implement separate classes of service it is necessary to use them in the entire communication infrastructure, which introduces additional costs that are hard to accept since the entire logic must be duplicated.

A third order of problems is linked to the fact that frequently the components that function as initiators (CPUs, video/audio decoders, DMAs, etc.), in order to ensure consistency, wait for the interconnect to be able to supply the data to the destination so as to guarantee the order. When this need arises it is not possible to use the virtual channels.

SUMMARY

Thus, there exists a need to have available a support that is able to simplify drastically the problems referred to above so as to provide an effective end-to-end QoS, and this, among other things, in order to enable the designer of the interconnect to specify the performance requirements for each of the components functioning as initiators via simple parameters so as to enable implementation of very complex SoCs, at the same time reducing the costs and the time-to-market drastically. An object of the present invention is to provide such a solution.

According to the invention, said object is achieved thanks to a method having the characteristics recited specifically in the ensuing claims. The invention also regards a corresponding system, as well as a computer program product, that can be loaded into the memory of at least one computer and comprises parts of software code that are able to implement the steps of the method when the product is run on at least one computer. As used herein, the reference to such a computer program product is understood as being equivalent to the reference to a computer-readable means or medium containing instructions for control of the processing system in order to co-ordinate implementation of the method according to the invention. The reference to "to at least one computer" is evidently meant to highlight the possibility of the present invention being implemented in modular form and/or distributed form.

The claims form an integral part of the disclosure provided herein in relation to the invention.

Various embodiments are suited to being used in a context in which the on-chip interconnect solutions are supplied to the teams responsible for integration of SoCs in the form of a highly configurable IPs. In design of the interconnects, the task of SoC designers is hence to select various components to be instantiated in their configuration in order to ensure proper functionality and to meet the performance constraints.

Various embodiments make it possible to take into account the fact that, as the complexity of a SoC increases, the problem of sizing the communication infrastructure correctly to meet the performance constraints becomes demanding and such as to require a large number of tests of simulation steps, passing through non-optimized interconnects, with an adverse effect on costs and time-to-market.

Various embodiments offer a solution at the system level that overcomes the drawbacks outlined above via a set of simple, fast, and configurable characteristics such as to enable an end-to-end QoS to be obtained in an efficient way.

Various embodiments enable implementation of an action of prediction (look-ahead function) and of control of performance in interconnects that from other points of view are of a traditional type, in the framework of modern Networks-on-Chip, as well as in mixed solutions, offering the designer the possibility of tackling the problems at the system level.

Various embodiments enable development of on-chip interconnects with an end-to-end support for QoS suited for typical SoC applications. This possibility offers various advantages in particular as regards the creation of more complex SoCs with higher performance levels, lower development costs, and shorter time-to-market.

Modern SoCs incorporate various IPs, which co-operate to perform the overall functions of the system: CPUs, audio/video decoders, external-memory controllers, on-chip memories, etc. Usually each of these IPs has given requirements in terms of bandwidth and/or latency. The aim is that the quality of service (QoS) of the interconnect should provide services that are able to satisfy all these requirements: in other words, it must implement the desired set of classes of service. Since SoCs usually incorporate also subsystems based upon circuit-switching interconnects incorporated/associated in/to a packet-switching Network-on-Chip area, in various embodiments the solution in terms of QoS is able to co-exist with these various interconnect technologies.

Various embodiments aim at meeting the need to provide a low-cost QoS solution that is able to support all the classes of service required so as to "cover" the SoC applications, guaranteeing a sufficient isolation between these classes of service (minimization of the interference) and fixing various performance requirements also for IPs included in one and the same class of service so as to render performance as far as possible independent of the network configuration, hence operating in an end-to-end perspective.

In various embodiments, this result is obtained by resorting to various aspects of solution, as better illustrated in what follows:

the overall priority field is divided into C subfields (where C is the number of the classes of service);

the class of a particular initiator is fixed at input to the network by imposing a limitation on the priority signal;

the sense of urgency results in a priority value on the initiator side, and this value is sent on the network in such a way that the same can be used so as to execute a function of arbitration of the resources;

a dynamic regulation of the priorities for each initiator is performed: it is possible to generate the priority on the basis of the bandwidth measured using, for example, strategies of generation of the priorities of different types;

a separate network of the priorities is implemented so as to send the priority values where they are required (in the points where the arbitration is performed) and, at least potentially, in each point of the interconnect, in a way independent of the protocol;

then a mechanism is implemented to take into account the history of each component of the network: when a datum is written, for example, in a FIFO queue (in any area of the network), also a priority value is stored at input; then, at each subsequent instant, the priority at output from a component that incorporates at least one FIFO queue is the maximum value from among the priority values contained in the FIFO queue and the priority received at input, according to a function that can be defined "priority virtual path" (PVP); this function can be implemented by all the components on paths shared between IPs belonging to different classes of service.

Various embodiments present at least some of the following advantages:

predictability/control of performance, with consequent reduction of development times and costs;

end-to-end approach, with the possibility of avoiding the need to face the problem within the network;

consideration of the problem of QoS from an abstract standpoint, which enables a hardware configuration referred to a certain QoS to be established via simple rules (for example, for the algorithms);

facilitated back end, thanks to the possibility of uncoupling the logical and physical topologies so as to enable SoC designers to group the IPs taking into account only the physical constraints, without any need to pay particular attention to the requirements in terms of performance, which are likely to introduce further difficulties in the creation of the back end;

savings in terms of area on silicon, linked to the use of simpler interconnect architectures;

reduction of the absorption of energy, linked to the possibility of using lower clock frequencies;

consideration of the QoS also from the software standpoint: thanks to the end-to-end property, the configuration in terms of performance can be regulated/updated, even after production of the chip, in so far as a set of programming registers enable software developers to program the QoS starting from the application requirements;

low-cost implementation of QoS, thanks to the use of simple components; and possibility of developing complex SoCs in view of the considerations referred to previously.

BRIEF DESCRIPTION OF THE DRAWINGS

The invention will now be described, purely by way of non-limiting example, with reference to the annexed representations, wherein.

DETAILED DESCRIPTION OF PREFERRED EMBODIMENTS

Illustrated in the ensuing description are various specific details aimed at an in-depth understanding of the embodiments. The embodiments can be obtained without one or more of the specific details, or with other methods, components, materials etc. In other cases, known structures, materials or operations are not shown or described in detail so that various aspects of the embodiments will not be rendered obscure.

The reference to "an embodiment" or "one embodiment" in the framework of this description indicates that a particular configuration, structure or characteristic described in relation to the embodiment is comprised in at least one embodiment. Hence, phrases such as "in an embodiment" or "in one embodiment", which may be present in various points of this description, do not necessarily refer to one and the same embodiment. Furthermore, particular conformations, structures or characteristics can be combined adequately in one or more embodiments.

The references used herein are only for convenience and hence do not define the sphere of protection or the scope of the embodiments.

Figure 1:
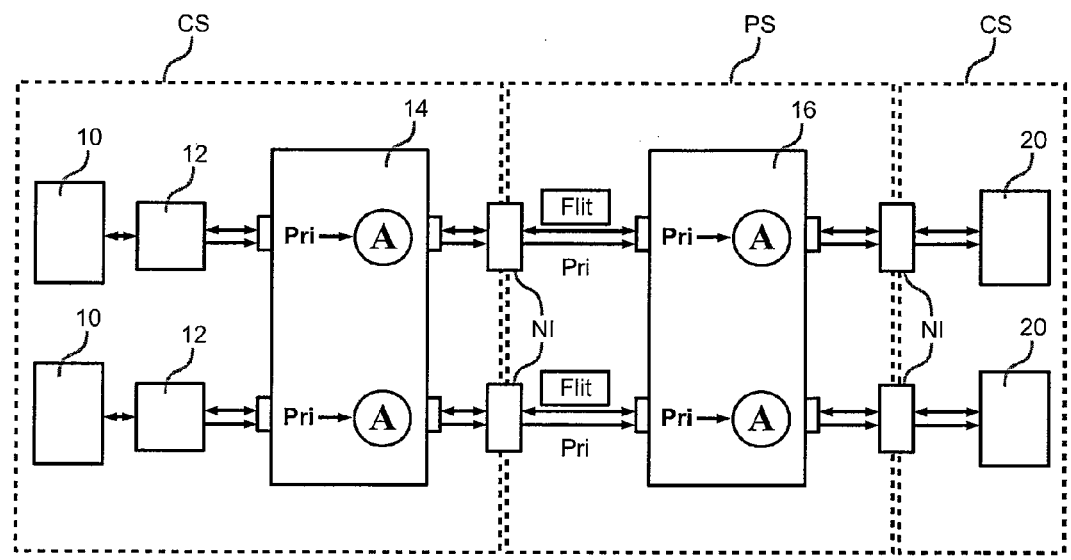
FIG. 1 is a block diagram of a mixed interconnect according to one embodiment.

The block diagram of FIG. 1 regards a mixed-interconnect scheme designed to enable communication between one or more IPs that are to function as initiators, designated by 10, and one or more IPs that are to function as targets, designated by 20. The interconnect is defined as "mixed" in so far as the connection comprises, at the initiators 10, a circuit-switching network CS and, on the side of the targets 20, a further circuit-switching network CS with a packet-switching network PS set between the two circuit-switching networks CS.

The interconnection between the various network sections CS, PS, CS is made through network interfaces NI.

The IPs functioning as initiators 10 have associated to them respective modules with dynamic-bandwidth-allocator (DBA) functions 12, whilst the references 14 and 16 designate, respectively, the cores of the first circuit-switching network CS, constituted, for example, by a STBus module or by an AXI module, and, respectively, a network-on-chip (NoC).

In the example of FIG. 1, three main partitions of the interconnect are hence present, constituted, precisely, by the two circuit-switching portions CS and by the packet-switching portion PS set between them. It may be assumed that, as occurs frequently in real SoCs, there are arbitration functions performed both in the circuit-switching networks CS and in the packet-switching network or networks PS.

In this regard, it will be appreciated that the example represented in FIG. 1 is only one of the many possible examples of implementation of a mixed interconnect. Various embodiments can comprise a different number of circuit-switching and/or packet-switching networks cascaded even according to an order different from what is represented by way of example in FIG. 1.

For simplicity of illustration, it will be assumed in what follows that the cores 14 and 16 are nodes of a 2×2 full-crossbar type (this being the most common type of components normally used for routing and arbitration). Such a solution is independent of the specific protocols adopted at the level of circuit switching and of packet switching.

The example considered herein envisages that the circuit-switching interfaces are connected to the NoC via components of network interfaces NI. In a complex SoC interconnect there may be further components not envisaged in the example considered here, which precisely is just one example: said further components may be, for example, size converters, frequency converters, asynchronous/mesochronous connections, buffers, etc. It will be appreciated that the possible presence of these further elements does not vitiate the considerations made in what follows.

The components 12 to which the dynamic-bandwidth-allocator function is entrusted are represented associated to the IPs functioning as initiators 10. It would, however, be possible to choose also a different location: in general, a component with the dynamic-bandwidth-allocator function can be located where it is able to perform a function of control of the performance.

On the basis of the bandwidth measured, it is possible to generate a corresponding priority value on the basis of the bandwidth measured using, for example, strategies of generation of the priority of different types. Various embodiments can use the solution described in Italian Patent Application No. TO2009A000337, filed in the name of the present applicant in Italy and in the United States under U.S. patent application Ser. No. 12/759,229, incorporated herein in its entirety by this reference.

In various embodiments, such as the one considered here, a network is provided dedicated for the priorities, which extends starting from the components 12 towards the entire network, for example, extending as far as the targets or else terminating at the last point, where an arbitration function is performed. In various embodiments, it may in fact be useful to exploit the information on the priority within the targets 20 to achieve some form of optimization (for example, scheduling of the memory access).

The number of priority bits can be chosen in an arbitrary way. In various embodiments, a value of five bits is adopted, which is considered a realistic value to take into account all the possible situations. In various embodiments, the priority signals are not treated in a distinct or different way in the circuit-switching networks CS and in the packet-switching networks PS.

Passing to an examination of the operation of the dedicated priority network, it will be noted that the priority signal at output from each component is driven cycle by cycle without the need to have a control of the flow. In this way, it is possible to have a propagation of the priority even though the flow of the data is blocked or if the queues, for example FIFO queues, are full. This result can be obtained thanks to the co-operation of the dedicated priority network and of the priority virtual path, which will be described more fully in what follows. In addition to this, the fact of having a separate network for the priority means that in NoCs, where the control information is carried only by the header "flits" (flow control digits), there exists the possibility of updating the priority even when the payload flits are propagating in the network.

From another standpoint, it may be stated that in various embodiments, the dedicated priority network and the priority virtual path enable isolation of the classes of service, in the sense that the urgent traffic is not affected by non-urgent traffic. This also means that in critical situations it is possible to penalize temporarily IPs not having requirements of urgency to favor IPs that do have requirements of urgency.

The policy of management of the priority bus depends upon the particular type of component.

For example, the output priority of the elements 12, to which the dynamic assignment of the bandwidth is entrusted, is updated cycle by cycle according to the bandwidth-control algorithm.

In the case of combinational components of a 1×1 type (one input/one output), the input priority is simply propagated to the output. For the 1×1 components comprising at least one queue, for example, a FIFO queue (where the FIFO queue can even be a mere register), the output priority at each clock cycle depends upon whether the component implements or not the function of the priority virtual path (PVP).

In particular:
  if the PVP function is not enabled, the input priority is stored/read into/from the FIFO queue together with the data; and
  in the case where the PVP function is enabled, once again the input priority is stored in the FIFO queue together with the data, but in this case the output priority at each instant is the highest amongst the priority values contained in the FIFO queue and the priority received at input.

For the selection of said maximum value, it is possible to resort to a look-ahead function implemented according to the criteria illustrated in Italian Patent Application No. TO2009A000927, assigned to the assignee of the present case, which is incorporated herein in its entirety by this reference.

In various embodiments, in the case of situations of urgency (data flows blocked and/or data at input with high priority), the nodes enable propagation of the urgent information through the network up to the point of arrest (somewhere in a node). This behavior is obtained by ensuring that the output priority in at each output port (target) is selected by the input port (initiator). If, for example, the node is blocked on a particular pair of initiators/targets, even though the data flow is stopped, the priority received on the initiator port is propagated to the right target port. If the node incorporates input and/or output buffers (as occurs normally in NoCs), the PVP function enables management of a traffic containing data from IPs belonging to different classes of service.

In various embodiments, it is possible to identify four main classes of service.

A first class is the one that can be defined as "Average Bandwidth Critical" (ABC). Belonging to this class are all the IPs that have requirements in terms of bandwidth, but on the other hand are insensitive to latency questions. In practice, the IPs in this class have a bandwidth budget guaranteed over wide windows.

A second class can be defined as "Soft Real Time" (SRT): this class groups the IPs with requirements in terms of latency that are aimed at preventing their internal FIFO queues from possibly becoming either all full or all empty. Hence they are real-time IPs that are guaranteed a bandwidth in narrow time windows.

A third class can be defined as "Hard Real Time" (HRT). These are IPs having requirements in terms of latency that are once again aimed at preventing their internal FIFO queues from possibly becoming either all full or all empty. Hence they are they are real-time IPs that are guaranteed a bandwidth in narrow time windows.

A fourth class can then be defined as "Latency Critical" (LC): these are requests that must arrive at destination as soon as possible (for example, cache filling).

In this regard, it will be appreciated that the distinction between the classes SRT and HRT aims at distinguishing further between real-time IPs that have more or less stringent requirements. Since some real-time IPs have significantly more stringent requirements than others, it is useful to be able to make the aforesaid distinction in hardware, guaranteeing that in conditions of "urgency" some IPs (HRT IPs) have in any case precedence over others (SRT IPs), albeit defining in a formal way and in absolute terms the difference between the two classes. However, in real systems, it is in general possible to identify some real-time IPs that have particularly stringent requirements.

It will likewise be appreciated that various embodiments enable implementation of an arbitrary number of classes of service. From another standpoint, the fact of having IPs with different requirements means that the bandwidth is controlled and distributed according to the requirements in terms of performance both from the spatial standpoint (between the various IPs), and from the temporal standpoint (in time).

Figure 2:
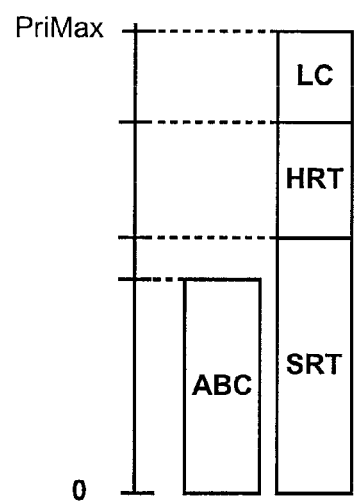
FIG. 2 illustrates an example of mapping of classes of service.

In the embodiment exemplified by FIG. 2, the classes of service identified are mapped on the priority range.

For those classes do not overlap, the elements 12, which are entrusted with the function of dynamic assignment of the bandwidth, adjust the bandwidth between the various IPs that belong to one and the same class as long as there remain active initiators belonging to the higher classes.

In the case of superposition between the classes ABC and SRT it is possible to include in the function of regulation of the bandwidth all the IPs belonging to both of the classes. This approach aims at offering to the IPs comprised in the ABC class the possibility of prevailing at an arbitration level even though there are active IPs in the SRT class.

The space between the SRT and ABC classes ensures that in critical conditions the IPs in the SRT class will prevail over the IPs in the ABC class, it thus being possible to satisfy the real-time requirements. This gap can be adjusted.

As has already been said, in various embodiments the components 12 can be made so as to operate according to the solution described in the patent application No. TO2009A000337, filed in the name of the present applicant. In some embodiments, in the framework of a solution of this type, a further strength parameter, which can be defined as "Strength Down" (STRD), is taken into account. In the patent application just referred to, the parameter "Strength" defines the maximum priority value that can be achieved; in a similar way, the parameter STRD considered here defines the minimum priority value. Consequently, these two parameters enable as a whole selection of the priority class that regulates operation of the component 12.

In various embodiments, the parameters of the component 12 are used to specify the requirements in terms of bandwidth, to choose the class of service QoS, to render adjustment stable, to choose the correct time window, and to specify the initiators to be penalized in critical situations.

The table below summarizes the meaning and effect of the parameters that regulate operation of elements 12 so as to be able to make the right choice of configuration window.

| | |
|---|---|
| W (configurable) -- Weight to assign to the history in the bandwidth calculation | Relation with dimension of transactions |
| RBW -- Required bandwidth | Specification of required bandwidth |
| STRU/STRD -- strengths maximum and minimum priority values that can be generated | Definition of classes of service. Differentiation of IPs also within one and the same class |
| GU/GD-gains, the priority-updating rate | Stability (reduction of priority oscillations) Relation between rate and window |

Since all these parameters except W are programmable, this solution enables the configurations of the components 12 to be set out to the software so as to enable software developers to modify and, if necessary, the specifications in terms of QoS.

Passing now to a description of a possible implementation of the priority-virtual-path (PVP) function the diagram of FIG. 3 again proposes, even though with a slightly different formalism, for reasons that will emerge more clearly in what follows, the mechanism of communication between a plurality of IPs functioning as initiators, designated by 10, and one or more IPs functioning as targets, designated by 20. Also in the diagram of FIG. 3 the reference number 12 designates the components entrusted with the dynamic-bandwidth-allocator function.

In general terms, the PVP function is implemented for all the components that incorporate at least one queue, such as a FIFO queue, and manage traffic coming from IPs belonging to different classes of service. A PVP function is hence associated to a queue, such as a FIFO queue.

Figure 3:
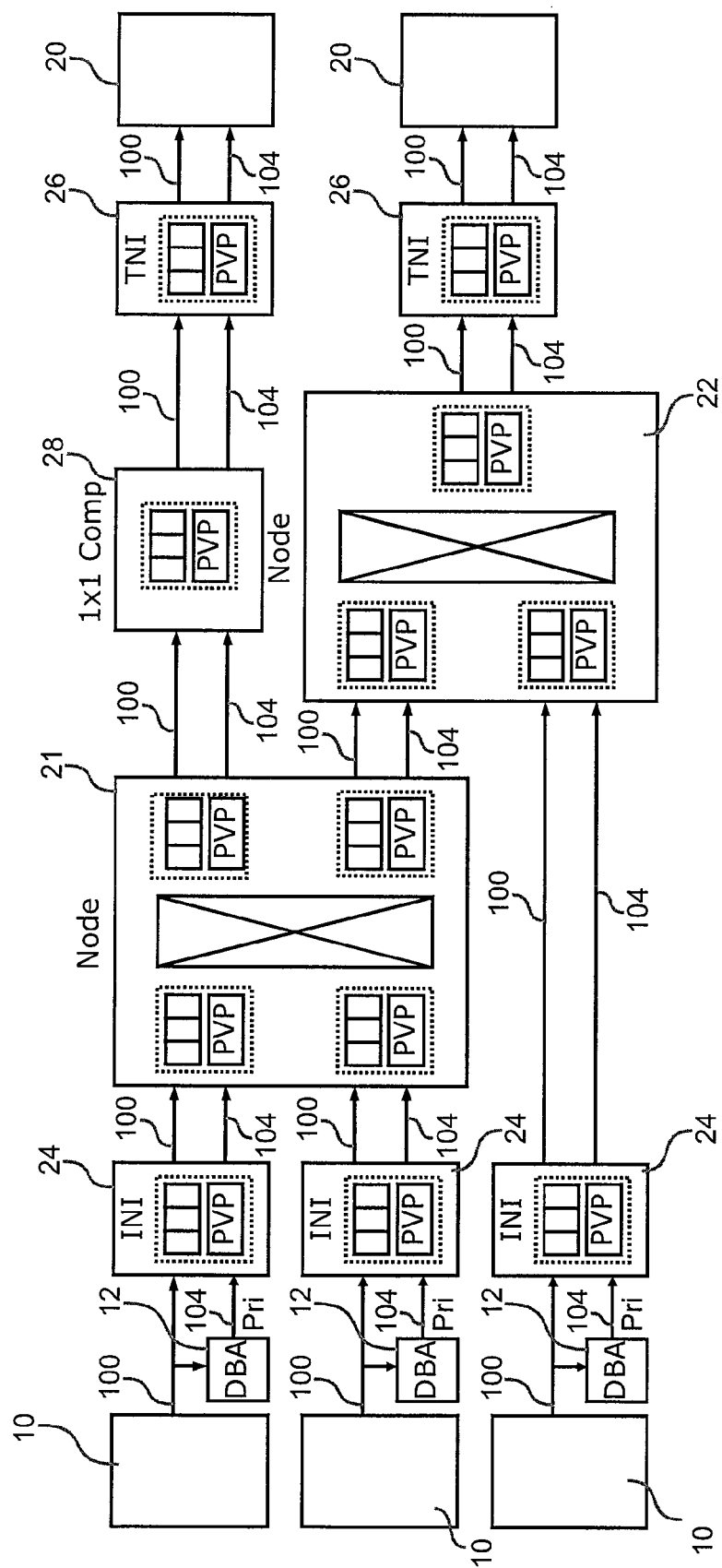
FIG. 3 is a diagram exemplifying one embodiment.

In the specific case, the diagram of FIG. 3 shows an example of interconnect for a NoC comprising a pair of nodes 21, 22, a set of interfaces 24 functioning as network interfaces, and initiator network interfaces (INIs) 26 functioning as target network interfaces (TNIs), as well as a component 28 chosen as generically representing a 1×1 component, present in which is a FIFO queue.

The diagram of FIG. 3 highlights the fact that the PVP function is used not only in the various network interfaces and in the 1×1 component but also in the input and output stages of the nodes 21 and 22 in so far as these incorporate buffers.

As has already been said, when the PVP function is activated, the priority at output from the component is the highest among the priorities associated to the data in the FIFO queue and the priority received at input.

Figure 4:
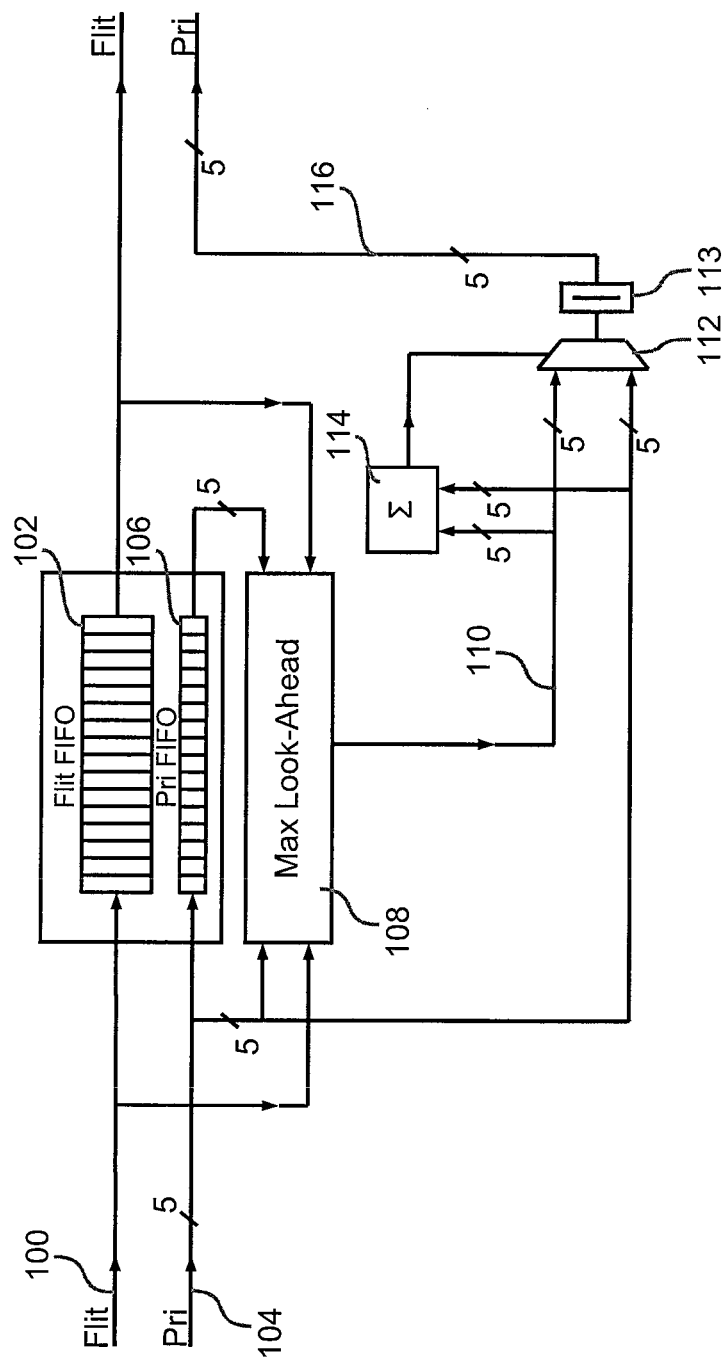
FIG. 4 illustrates an example of micro-architecture in one embodiment.

This behavior can be implemented via the micro-architecture illustrated in FIG. 4. In this case, it has been assumed that the priority signal has a dimension of 5 bits and that the component has NoC interfaces: the writing and reading of the flits is managed according to a typical flow-control scheme (Valid/ACK).

Operation according to the PVP criteria is summed up in what follows.

When a flit arriving on a line 100 is written in a flit FIFO queue (Flit FIFO 102) the priority value at input, arriving on a line 104 (see references 100 and 104 shown in FIG. 3), is written in a priority FIFO queue (Pri FIFO 106).

There is then present a look-ahead circuit 108, which is sensitive to the contents of the FIFO queue 106 (as well as to the signals present on the lines 100 and 104) and is able to perform a look-ahead function so as to supply at its output 110 a value corresponding to the highest of the priority values contained in the FIFO queue 106.

In various embodiments, this look-ahead function can be performed according to the modalities described more fully in Italian Patent Application No. TO2009A000927, identified previously herein.

A comparator 112, as well as a multiplexer 114 enable the maximum value between the priority value present on the input bus 104 and the priority value supplied by the circuit 108 that performs the look-ahead function to be obtained at each instant and to be applied on an output Pri line 116.

Also present in the embodiment illustrated is a register 118 (optional) used for re-clocking the output so as to enable acceleration of the clock rate.

In the form considered here, the FIFO queue of the priority values 106 is coupled to the flit FIFO queue 102 (the reading and writing pointers are the same). It is possible to use a similar micro-architecture even when the flit FIFO queue 102 is asynchronous: in this case, the operations of writing and reading are performed in different clock domains, and in this case the circuit 108 is able to manage asynchronous clocks.

Figure 5:
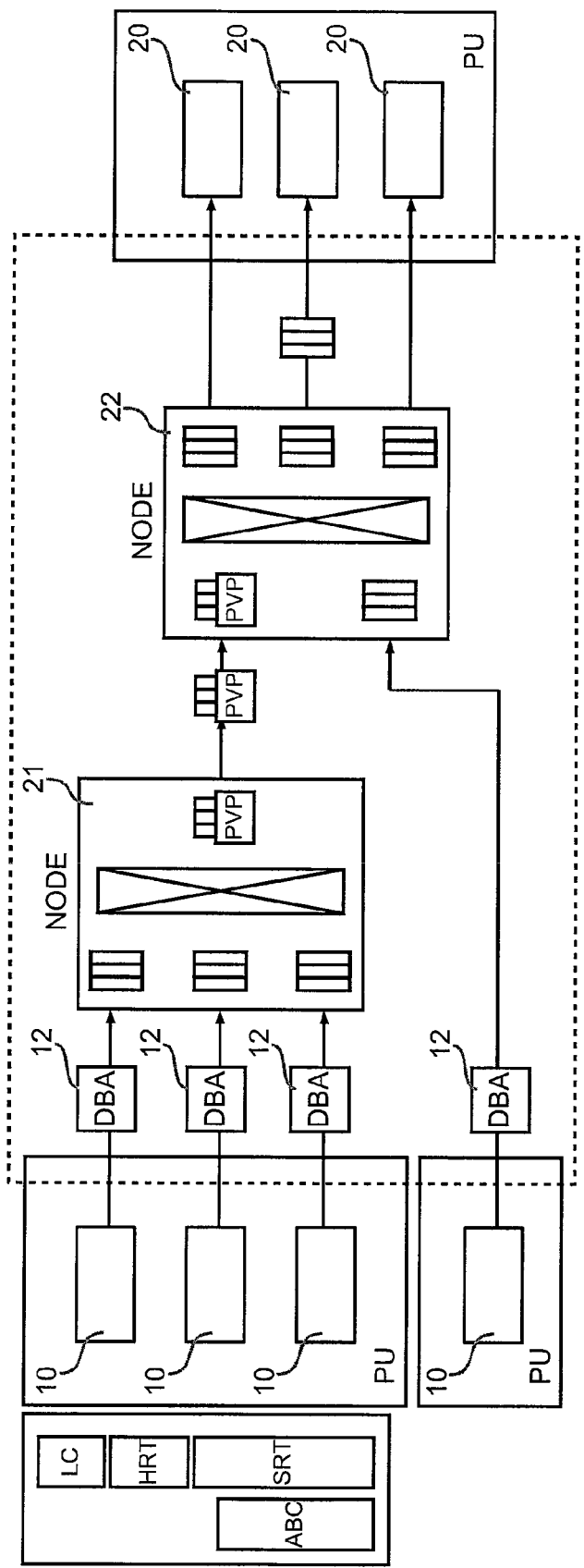
FIG. 5 represents one embodiment of design of QoS.

The diagram of FIG. 5 sums up, at the level of system representation, the concepts illustrated previously in particular as regards the communications between a set of IPs 10 functioning as initiators and a set of IPs 20 functioning as targets through an interconnect comprising, as in the example of embodiment of FIG. 3, two nodes 21 and 22.

In the example considered here, the IPs functioning as initiators 10 are grouped on the basis of physical constraints (for example, assuming that three of the initiators 10 are arranged on a first PU and the fourth on a second PU). Located at the output of the initiators 10 are the components 12 that perform the function of dynamic bandwidth assignment, select the classes of service (see the schematic representation of said classes of service on the left-hand side of FIG. 5), and perform the action of bandwidth adjustment.

It has likewise been assumed that the PVP function is provided where it is necessary to guarantee separation between the classes according to bottom-up criteria. In the connection between the two nodes 21 and 22, there is a convergence of traffic flows generated by the IPs that belong to different classes of service. Consequently, the PVP function enables the second node 22 to perform a priority look-ahead function that extends as far as the output stage of the first node 21. This ensures that, when for example a request of HRT class is entered in a queue after a request of ABC class, the degree of urgency can be communicated to the second node 22.

Various embodiments do not rule out the use, where possible, of the virtual-channel solution, if this can prove useful for the purposes of a further reduction of latency.

Various embodiments also enable implementation of an arbitrary number of classes of service, in addition to the four classes (ABC, SRT, HRT and LC) referred to previously.

Various embodiments would hence continue to be usable even though in future it were necessary to add new classes or contemplate a completely different organization.

In various embodiments, the configurability of the dynamic-bandwidth-allocator (DBA) components enables an automatic regulation independently of the particular organization of the classes (number and mutual position).

In various embodiments, the presence of a dedicated network for the propagation of the priority values enables hardware solution of the problem known in the literature as "head of line" or, in the framework of real-time software, as "priority inversion": said problem can arise when in given conditions it is difficult, if not even impossible, to propagate in the network the urgency information, for example, because the resources involved in the communication are not available in so far as they are being used by other initiators.

Of course, without prejudice to the principle of the invention, the details of construction and the embodiments may vary, even significantly, with respect to what has been illustrated herein purely by way of non-limiting example, without thereby departing from the scope of the invention as defined in the annexed claims.

The invention claimed is:

1. An on-chip interconnect method for conveying traffic arranged in a plurality of classes of service between a set of initiators in a circuit-switching network and a set of targets, comprising:

measuring, by component devices in said circuit-switching network, respective bandwidths of said traffic received from said initiators in said circuit-switching network;

associating, by said component devices, to said traffic, starting from said set of initiators, respective priority values representative of said classes of service and each respective priority value comprising a same number of bits;

propagating, by said component devices, said traffic in a first traffic network towards arbitration devices within said circuit-switching network;

propagating said respective priority values in a first priority network towards said arbitration devices within said circuit-switching network, wherein said first priority network is separate from said first traffic network;

performing arbitration at each arbitration device as a function of said priority values by at least
arranging the traffic in a form of a traffic FIFO queue,
arranging said priority values in a form of a respective priority FIFO queue, wherein said priority FIFO queue is different from said traffic FIFO queue,
associating to data in said traffic FIFO queue said priority values in said respective priority FIFO queue of priority values, and
operating a look-ahead circuit to perform a look-ahead function to supply at its output to a comparator device a highest priority value of the priority values contained in the respective priority FIFO queue;

obtaining, by said comparator device, a maximum priority value that is the greatest priority value between said highest priority value supplied by the look-ahead circuit and other priority values present on an input bus of said respective priority FIFO queue;

outputting, by said comparator device, said maximum priority value toward a second priority network within a packet-switching network; and outputting, by said traffic FIFO queue, said traffic in said traffic FIFO queue toward a second traffic network within said packet-switching network, wherein said second traffic network is separate from said second priority network.

2. The method of claim 1, including propagating said respective priority values on an on-chip dedicated network.

3. The method of claim 1, wherein said classes of service have respective associated bandwidths, the method including generating said priority values associated to each class of service as a function of the respective bandwidths.

4. The method of claim 1, including defining, within said classes of service, classes of service that do not overlap with each other and adjusting the bandwidth between initiators belonging to the same class until no active initiators remain belonging to the upper class out of those classes that do not overlap with each other.

5. The method claim 1, including defining, within said classes of service, at least two classes partly overlapping with each other by including in the adjustment of the bandwidth all those initiators belonging to said two classes.

6. The method of claim 1, further comprising:
defining, within said classes of service, at least one first real-time class associated to initiators operating in real time and at least one second class grouping initiators which are insensitive to latency, and
in arbitration, giving priority to said real-time classes of service with respect to said latency-insensitive class of service.

7. The method of claim 1, wherein the plurality of classes of service comprises an average bandwidth critical class of service, a soft real time class of service, a hard real time class of service, and a latency critical class of service.

8. An on-chip interconnect network configured to convey traffic arranged in a plurality of classes of service between a set of initiators and a set of targets, said on-chip interconnect network comprising:
a circuit-switching network comprising the set of initiators, a plurality of component devices, a first traffic network, a first priority network, and a plurality of arbitration devices;
a packet switching network comprising a second priority network, and a second traffic network; and
a comparator device coupled to the plurality of arbitration devices and a look-ahead circuit;
the plurality of component devices configured to measure respective bandwidths of said traffic received from said set of initiators, associate to said traffic, starting from said set of initiators, respective priority values representative of said classes of service and each respective priority value comprising a same number of bits, propagate said traffic in the first traffic network towards the plurality of arbitration devices, and propagate said respective priority values in the first priority network towards said arbitration devices, wherein said first priority network is separate from said first traffic network;
each arbitration device configured to perform arbitration as a function of said priority values by at least arranging the traffic in a form of a traffic FIFO queue, arranging said priority values in a form of a respective priority FIFO queue, wherein said priority FIFO queue is different from said traffic FIFO queue, associating to data in said traffic FIFO queue said priority values in said respective priority FIFO queue of priority values, and operating the look-ahead circuit to perform a look-ahead function to supply at its output to the comparator device a highest priority value of the priority values contained in the respective priority FIFO queue;
said comparator device configured to obtain a maximum priority value that is the greatest priority value between said highest priority value supplied by the look-ahead circuit and other priority values present on an input bus of said respective priority FIFO queue, and output said maximum priority value towards the second priority network within the packet-switching network; and
said traffic FIFO queue configured to output said traffic in said traffic FIFO queue toward the second traffic network, wherein said second traffic network is separate from said second priority network.

9. The on-chip interconnect network of claim 8 further comprising a network interface between the circuit-switching network and the packet-switching network.

10. The on-chip interconnect network of claim 8 further comprising a network interface between the packet-switching network and the set of targets.

11. The on-chip interconnect network of claim 8, wherein the plurality of classes of service comprises an average bandwidth critical class of service, a soft real time class of service, a hard real time class of service, and a latency critical class of service.

12. A computer program product on a non-transitory computer readable medium for performing a method of conveying traffic arranged in a plurality of classes of service between a set of initiators in a circuit-switching network and a set of targets, the method comprising:
measuring, by component devices in said circuit-switching network, respective bandwidths of said traffic received from said initiators in said circuit-switching network;
associating, by said component devices, to said traffic, starting from said set of initiators, respective priority values representative of said classes of service and each respective priority value comprising a same number of bits;
propagating, by said component devices, said traffic in a first traffic network towards arbitration devices within said circuit-switching network;
propagating said respective priority values in a first priority network towards said arbitration devices within said circuit-switching network, wherein said first priority network is separate from said first traffic network;
performing arbitration at each arbitration device as a function of said priority values by at least
arranging the traffic in a form of a traffic FIFO queue,
arranging said priority values in a form of a respective priority FIFO queue, wherein said priority FIFO queue is different from said traffic FIFO queue,
associating to data in said traffic FIFO queue said priority values in said respective priority FIFO queue of priority values, and
operating a look-ahead circuit to perform a look-ahead function to supply at its output to a comparator device a highest priority value of the priority values contained in the respective priority FIFO queue;
obtaining, by said comparator device, a maximum priority value that is the greatest priority value between said highest priority value supplied by the look-ahead circuit and other priority values present on an input bus of said respective priority FIFO queue;
outputting, by said comparator device, said maximum priority value toward a second priority network within a packet-switching network; and
outputting, by said traffic FIFO queue, said traffic in said traffic FIFO queue toward a second traffic network within said packet-switching network, wherein said second traffic network is separate from said second priority network.

13. The computer program product of claim 12, including propagating said respective priority values on an on-chip dedicated network.

14. The computer program product of claim 12, wherein said classes of service have respective associated bandwidths, the method including generating said priority values associated to each class of service as a function of the respective bandwidths.

15. The computer program product of claim 12, including defining, within said classes of service, classes of service that do not overlap with each other and adjusting the bandwidth between initiators belonging to the same class until no active initiators remain belonging to the upper class out of those classes that do not overlap with each other.

16. The computer program product of claim 12, including defining, within said classes of service, at least two classes partly overlapping with each other by including in the adjustment of the bandwidth all those initiators belonging to said two classes.

17. The computer program product of claim 12, further comprising:
   defining, within said classes of service, at least one first real-time class associated to initiators operating in real time and at least one second class grouping initiators which are insensitive to latency, and
   in arbitration, giving priority to said real-time classes of service with respect to said latency-insensitive class of service.

18. The computer program product of claim 12, wherein the plurality of classes of service comprises an average bandwidth critical class of service, a soft real time class of service, a hard real time class of service, and a latency critical class of service.

* * * * *